US011025595B2

United States Patent
Kandregula

(10) Patent No.: US 11,025,595 B2
(45) Date of Patent: Jun. 1, 2021

(54) SECURE AND ANONYMOUS DATA SHARING

(71) Applicant: Samsung Electronics Co., Ltd., Suwon-si (KR)

(72) Inventor: Naga R. Kandregula, Cupertino, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 201 days.

(21) Appl. No.: 16/178,919

(22) Filed: Nov. 2, 2018

(65) Prior Publication Data

US 2019/0319932 A1    Oct. 17, 2019

Related U.S. Application Data

(60) Provisional application No. 62/658,441, filed on Apr. 16, 2018.

(51) Int. Cl.
*H04L 29/06* (2006.01)
*H04L 29/08* (2006.01)

(52) U.S. Cl.
CPC ........ *H04L 63/0421* (2013.01); *H04L 67/146* (2013.01); *H04L 67/20* (2013.01)

(58) Field of Classification Search
CPC ... H04L 63/0421; H04L 67/20; H04L 67/146; H04L 67/306; H04L 2209/80;
(Continued)

(56) References Cited

U.S. PATENT DOCUMENTS 7,552,862 B2    6/2009    Flake et al.
8,856,884 B2 *  10/2014   Bevan ................ H04L 67/2814
                                                                    726/4
(Continued)

FOREIGN PATENT DOCUMENTS

KR    10-1643339 B1    7/2016
KR    10-1794832 B1    11/2017
(Continued)

OTHER PUBLICATIONS

"OAuth"; WikipediA, https://en.wikipedia.org/wiki/OAuth.,edited Jul. 18, 2018, 8 pages.

*Primary Examiner* — Ashokkumar B Patel
*Assistant Examiner* — Quazi Farooqui

(57) ABSTRACT

A method and system for sharing data anonymously between a user's electronic device and a third-party host is provided. A data vault receives, from the electronic device, information about the electronic device and a third-party identifier. The third-party identifier uniquely identifies the third-party host. Using the information about the electronic device and the third-party identifier, the data vault validates the authenticity of the electronic device and the third-party host and identifies a user preference. The data vault server creates an authenticated baton payload that includes the user preference and does not contain user identification information. The data vault receives from the third-party host a request for user data with the authenticated baton payload previously provided to the electronic device. Upon verification of the request for user data and the authenticated baton payload, the data vault provides the requested data to the third-party host without the user identification information.

20 Claims, 11 Drawing Sheets

(58) Field of Classification Search
CPC . H04L 9/3213; H04L 9/3239; H04L 63/0823; H04L 2209/38; H04L 63/102; H04L 29/06; H04L 29/08
See application file for complete search history.

(56) References Cited

U.S. PATENT DOCUMENTS

| | | | |
|---|---|---|---|
| 9,069,934 B1* | 6/2015 | Meeboer | G06Q 30/0277 |
| 9,239,834 B2 | 1/2016 | Donabedian et al. | |
| 9,883,395 B2 | 1/2018 | Ranganathan et al. | |
| 9,898,734 B2 | 2/2018 | Ren et al. | |
| 9,904,791 B1 | 2/2018 | Thankappan et al. | |
| 10,348,715 B2* | 7/2019 | Ross | H04L 63/0823 |
| 2004/0181669 A1* | 9/2004 | Schutzer | H04M 3/382 |
| | | | 713/168 |
| 2008/0214210 A1* | 9/2008 | Rasanen | H04W 4/029 |
| | | | 455/456.3 |
| 2011/0314502 A1* | 12/2011 | Levy | H04N 7/106 |
| | | | 725/46 |
| 2015/0339732 A1 | 11/2015 | Lee et al. | |
| 2016/0027399 A1 | 1/2016 | Wilde et al. | |
| 2017/0092076 A1 | 3/2017 | Anderson et al. | |
| 2017/0118638 A1* | 4/2017 | Zhang | H04L 63/0876 |
| 2017/0236376 A1 | 8/2017 | Carrico et al. | |
| 2017/0243206 A1 | 8/2017 | Kieffer et al. | |
| 2017/0330180 A1 | 11/2017 | Song et al. | |
| 2019/0149523 A1* | 5/2019 | Shin | G06F 21/62 |
| | | | 713/176 |

FOREIGN PATENT DOCUMENTS

| | | |
|---|---|---|
| KR | 10-1800737 B1 | 11/2017 |
| KR | 10-2018-0029695 A | 3/2018 |

* cited by examiner

SECURE AND ANONYMOUS DATA SHARING

CROSS-REFERENCE TO RELATED APPLICATION(S) AND CLAIM OF PRIORITY

This application claims priority under 35 U.S.C. § 119(e) to U.S. Provisional Patent Application No. 62/658,441 filed on Apr. 16, 2018 and entitled "SYSTEM AND METHOD FOR SECURE ANONYMOUS DATA SHARING". The above-identified provisional patent application is hereby incorporated by reference in its entirety.

TECHNICAL FIELD

This disclosure relates generally to sharing data between electronic devices. More specifically, this disclosure relates to secure and anonymous data sharing between electronic devices.

BACKGROUND

There are situations where mobile device users would like to grant websites, applications or third-party servers access to some of user's personal interests or other user related user information anonymously. In particular, the user does not want to provide their personal identification information or other sensitive personal information that can be used by, for example, the third-party server to identify, contact or locate the specific user of a mobile device. The user's personal identification information is often not required or needed by a third-party server to attend to or complete a service or transaction. Yet, often times a third-party server either requests or is provided unnecessary superfluous information about a user during an electronic exchange of information. Additionally, often when personal information is provided by a user to a third-party server there is little or no security that authenticates that the client device and the third-party server requesting information about the user are each actually who they indicate who they are. As such, data sharing with existing technologies is vulnerable to impersonation attacks and fraudulent data sharing on the part of both the client device and the third party entities.

SUMMARY

This disclosure provides a system and method that enables a user's electronic device to securely and anonymously share user related data with a third-party system via an intermediary data vault server. Embodiments of this disclosure provide secure anonymous data sharing services of user's data to a third-party entity, non-user server, or hosts after the third-party entity, as well as the user's electronic device, are both uniquely identified and verified at each instance of data being shared. Furthermore, user related data that is shared with the third-party entity is strictly limited by directional parameters obtained or approved by the user and other parameters derived the data vault server system based on analytics using user, population, and other behavior models.

In a first embodiment, a method for anonymous data sharing is provided. The method includes receiving, by a backend server, client device information and a third-party data package. The method includes identifying, based on the client device information and the third-party data package, a personal user preference from a plurality of personal user preferences. The method also includes creating an authenticated payload (AP) including a session identifier and the personal user preference without including a user identification. The method also includes sending the AP to a client device based on the client device information. The method further includes receiving, from a third-party server, a request for data and the AP previously sent to the client device. The method also includes providing, to the third-party server/device, requested data when the request for data corresponds with the personal user preference.

In a second embodiment, a backend server that provides anonymous data sharing is provided. The backend server includes a memory and at least one processor connected to the memory. The at least one processor is configured to receive, from a client device, client device information and a third-party data package. The at least one processor is also configured to identify, based on the client device information and the third-party data package, a personal user preference from a plurality of personal user preferences and/or population data. The at least one processor further is configured to create an authenticated payload (AP) including a session identifier and the personal user preference without revealing or including a user identification. The at least one processor also is configured to send the AP to a client device based on the client device information. The at least one processor also is configured to receive, from a third-party server, a request for data and the AP previously sent to the client device. The at least one processor is also configured to provide, to the third-party server/device, requested data when the request for data corresponds with the personal user preference(s) as established at the time of session initiation or subsequently during session modification operations.

In a third embodiment, a non-transitory computer-readable medium comprising a plurality of instructions that, when executed by a processor of a backend server system, is configured to cause the processor to receive, from a client device, client device information and a third-party data package. The plurality of instructions, when executed by the processor of the backend server is also configured to identify, based on the client device information and the third-party data package, a personal user preference from a plurality of personal user preferences. The plurality of instructions, when executed by the processor of the backend server is also configured to create an authenticated payload (AP) including a session identifier and the personal user preference without including a user identification. The plurality of instructions, when executed by the processor of the backend server is further configured to send the AP to a client device based on the client device information. The plurality of instructions, when executed by the processor of the backend server is also configured to receive, from a third-party server, a request for data and the AP previously sent to the client device. The plurality of instructions, when executed by the processor of the backend server is also configured to provide, to the third-party server, requested data when the request for data corresponds with the personal user preference.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 9, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

According to embodiments of the present disclosure, seamless secure anonymous data sharing can be accomplished between electronic end-user devices and a trusted third-party host system, server, or non-user electronic device after a backend data system uniquely identifies, authenticates and initiates a data sharing session. The data sharing session allows the third-party host system to obtain or exchange data with the end-user device within parameters set by the user's electronic device user and the backend data system. In various embodiments the data sharing session can also be modified by the user as required to add additional or remove existing parameters that control access to user data by the third-party host system. The exchange of data does not provide user identity information to the third-party host system and thus provides an anonymous secure and verified data sharing environment.

In various embodiments of the present disclosure, the backend system operates as a data vault backend system (DVBS) that can organize a user's personal data in to manageable, independently shareable elements or data. The independently shareable elements or data and rules associated with the shareable elements can be stored as a user device associated information matrix in a memory system of the data vault backend system. The information matrix can be accessed to share only appropriate data or elements when an authorized request is received from an authenticated third-party host system or non-user electronic device.

Figure 1:
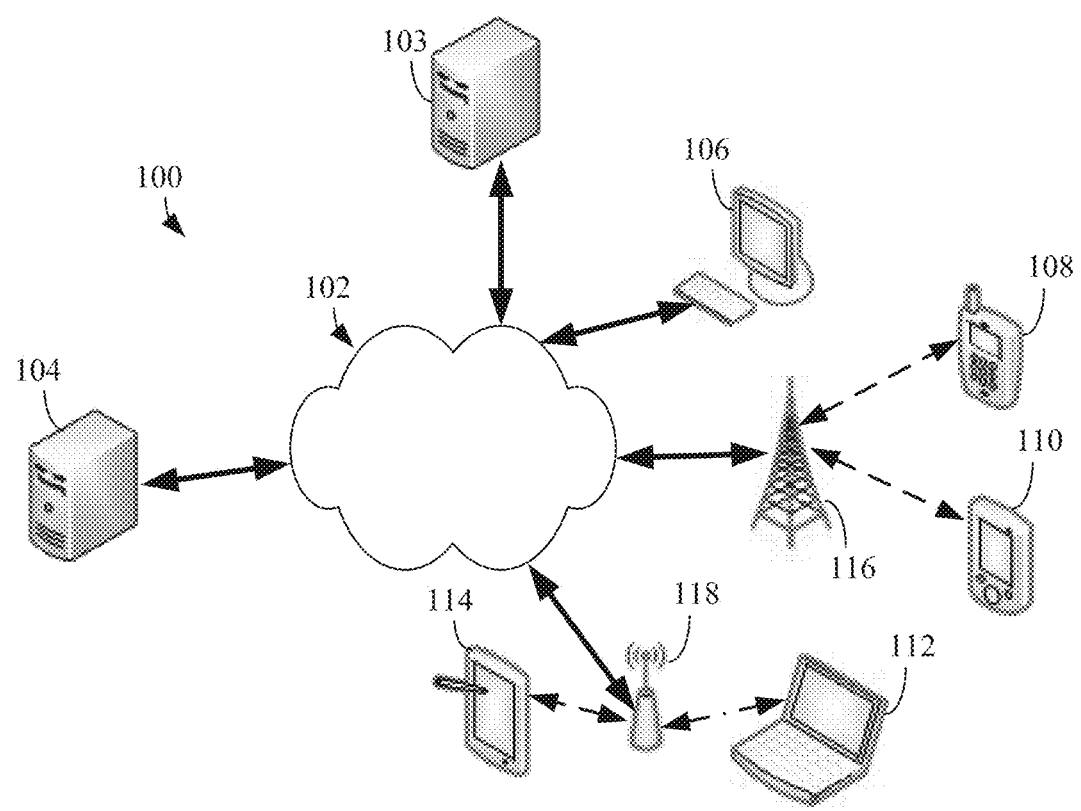
FIG. 1 illustrates an example communication system in accordance with embodiments of the present disclosure.

FIG. 1 illustrates an example system 100 according to embodiments of this disclosure. The embodiment of the system 100 shown in FIG. 1 is for illustration only. Other embodiments of the system 100 could be used without departing from the scope of this disclosure.

The system 100 includes a network 102 that facilitates communication between various components in the system 100. For example, network 102 can communicate Internet Protocol (IP) packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

The network 102 facilitates communications between various server(s) 104 and various client devices 106-114. Server 104 can represent one or more servers. Each server 104 includes any suitable computing or processing device that can provide computing services for one or more client devices. Each server 104 could, for example, include one or more processing devices, one or more memories storing instructions and data, and one or more network interfaces facilitating communication over the network 102.

Each client device 106-114 represents any suitable computing or processing device that interacts with at least one server or other computing device(s) over the network 102. In this example, the client devices 106-114 include a desktop computer 106, a mobile telephone or mobile devices 108 (such as a smartphone), a personal digital assistant (PDA) 110, a laptop computer 112, and a tablet computer 114. However, any other or additional client devices could be used in the system 100.

In this example, some client devices 108-114 communicate indirectly with the network 102. For example, the client devices 108 and 110 (mobile devices 108 and PDA 110, respectively) communicate via one or more base stations 116, such as cellular base stations or eNodeBs (eNBs). Mobile devices 108 include both smart phones and feature phones. Smart phones represent a class of mobile devices 108 that are a handheld device with a mobile operating system and an integrated mobile broadband cellular network connection for voice, short message service (SMS), and internet data communication. Feature phones represent a class of mobile devices 108 that are a midway point between a basic phone and a smart phone. Feature phones generally have voice calling and text messaging functions in addition to basic multimedia and internet capabilities. Also, the client devices 112 and 114 (laptop computer and tablet computer, respectively) communicate via one or more wireless access points 118, such as IEEE 802.11 wireless access points. Note that these are for illustration only and that each client device 106-114 could communicate directly with the network 102 or indirectly with the network 102 via any suitable intermediate device(s) or network(s).

In certain embodiments, the mobile device 108 (or any other client device 106-114) can transmit information securely and efficiently to another device, such as, for example, the servers 103 or 104. The mobile device 108 (or any other client device 106-114) can receive information from a non-user device that is to be transmitted to a backend server and processed to determine the authenticity of the non-user device. Such information can include image data, voice/audio data, geolocation data, user information, or other data received by or stored on the mobile device 108. The mobile device 108 (or any other client device 106-114) can trigger the information transmission between itself and server 104.

Although FIG. 1 illustrates one example of a system 100, various changes can be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

The processes and systems provided in this disclosure allow for end-user data to be shared anonymously with a third-party service, device or server, such as with a point of sale device or Internet of Things (IoT) device. The sharing of data can be done without providing the identity of the end-user. A data vault (DV) backend server 104 operates as an intermediary by authenticating each user or client device 108 and each non-user device 103 on behalf of both the user and non-user device or service. The DV backend server 104 provides an authenticated baton payload (ABP) or token to the client device 108 which is then shared with the non-user device 103. In various embodiments, an authenticated baton payload, a baton payload, payload or token can each be one or more data packets configured for the specified use. The non-user device 103 can then use the ABP to request data from the DV backend server 104. The DV backend server 104 authenticates the non-user device 103 and compares the received ABP with the ABP that was sent to the client device 108 prior to providing any requested user data to the non-user device 103.

Figure 2:
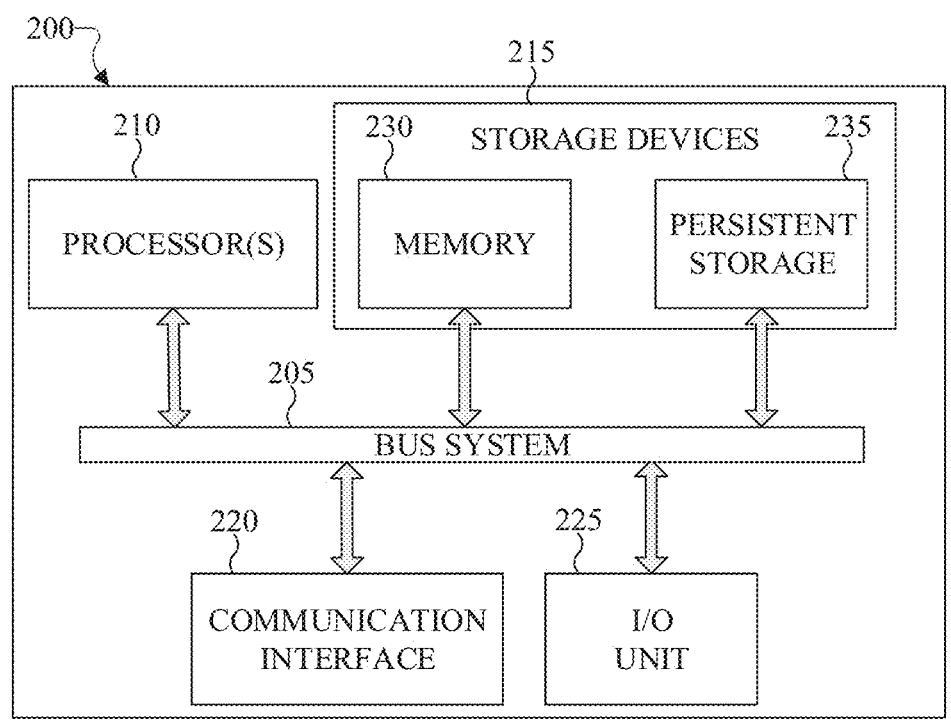
FIG. 2 illustrates an example electronic device server in accordance with embodiments of the present disclosure.
Figure 3:
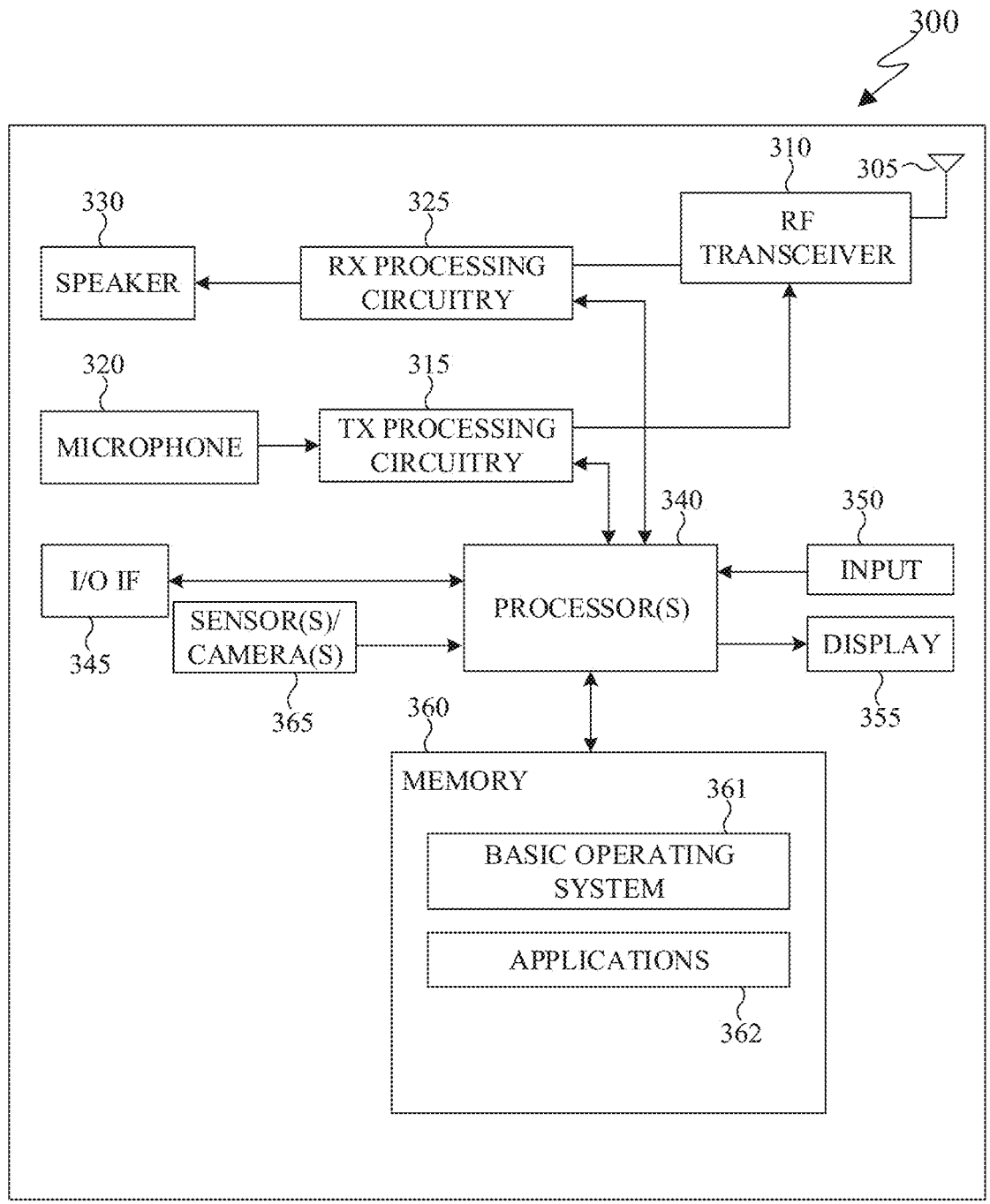
FIG. 3 illustrates an example electronic device in accordance with embodiments of the present disclosure.

FIGS. 2 and 3 illustrate example devices in a computing system in accordance with embodiments of the present disclosure. In particular, FIG. 2 illustrates an example server 200, and FIG. 3 illustrates an example electronic device 300. The server 200 could represent the server 103 or 104 in FIG. 1, and the electronic device 300 could represent one or more of the client devices 106-114 in FIG. 1.

Server 200 can represent one or more local servers or one or more neural network servers for processing received inputs through a trained neural network. As shown in FIG. 2, the server 200 includes a bus system 205 that supports communication between at least one processor(s) 210, at least one storage device(s) 215, at least one communications interface 220, and at least one input/output (I/O) unit 225.

The processor 210 executes instructions that can be stored in a memory 230. The processor 210 can include any suitable number(s) and type(s) of processors or other devices in any suitable arrangement. Example types of processor(s) 210 include microprocessors, microcontrollers, digital signal processors, field programmable gate arrays, application specific integrated circuits, and discreet circuitry.

The memory 230 and a persistent storage 235 are examples of storage devices 215 that represent any structure(s) capable of storing and facilitating retrieval of information (such as data, program code, neural network inputs and other data, or other suitable information on a temporary or permanent basis). The memory 230 can represent a random access memory or any other suitable volatile or non-volatile storage device(s). The persistent storage 235 can contain one or more components or devices supporting longer-term storage of data, such as a ready only memory, hard drive, Flash memory, or optical disc.

The communications interface 220 supports communications with other systems or devices. For example, the communications interface 220 could include a network interface card or a wireless transceiver facilitating communications over the network 102. The communications interface 220 can support communications through any suitable physical or wireless communication link(s).

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device.

Note that while FIG. 2 is described as representing the server 104 of FIG. 1, the same or similar structure could be used in one or more of the various client devices 106-114. For example, a desktop computer 106 or a laptop computer 112 could have the same or similar structure as that shown in FIG. 2.

FIG. 3 illustrates an electronic device 300 in accordance with an embodiment of this disclosure. The embodiment of the electronic device 300 shown in FIG. 3 is for illustration only and other embodiments could be used without departing from the scope of this disclosure. The electronic device 300 can come in a wide variety of configurations, and FIG. 3 does not limit the scope of this disclosure to any particular implementation of an electronic device. In certain embodiments, one or more of the devices 104-114 of FIG. 1 can include the same or similar configuration as electronic device 300.

In certain embodiments, the electronic device 300 is useable with data transfer applications. For example, the electronic device 300 can receive information, such as a quick response (QR) code and user information data, transfer the QR code and data to the backend server 200, 104, receive an ABP or token from the server 200, 104 indicating the result of processing the information through an authentication and access module was successful, and then send the token or ABP to a non-user device or third-party service server 103 to enable an anonymous data transfer between the backend server 104 and the non-user device or third party server 103. The electronic device 300 can be a mobile communication device, such as, for example, a wireless terminal, a desktop computer (similar to desktop computer 106 of FIG. 1), a mobile device (similar to mobile device 108 of FIG. 1), a PDA (similar to PDA 110 of FIG. 1), a laptop (similar to laptop computer 112 of FIG. 1), a tablet (similar to tablet computer 114), and the like.

As shown in FIG. 3, the electronic device 300 includes an antenna 305, a communication unit 310, a transmit (TX) processing circuitry 315, a microphone 320, and a receive (RX) processing circuitry 325. The communication unit 310 can include, for example, a RF transceiver, a BLUETOOTH transceiver, a WI-FI transceiver, ZIGBEE, infrared, and the like. The electronic device 300 also includes a speaker 330, a processor 340, an input/output (I/O) interface 345, an input 350, a display 355, a memory 360, a sensor(s) 365, and a biometric scanner 370. The memory 360 includes an operating system (OS) 361, applications 362, and user data 363.

The communication unit 310 receives, from the antenna 305, an incoming RF signal transmitted such as a BLUETOOTH or WI-FI signal from an access point (such as a base station, Wi-Fi router, Bluetooth device) of the network 102 (such as a Wi-Fi, Bluetooth, cellular, 5G, LTE, LTE-A, WiMAX, or any other type of wireless network). The communication unit 310 can down-convert the incoming RF signal to generate an intermediate frequency or baseband signal. The intermediate frequency or baseband signal is sent to the RX processing circuitry 325 that generates a processed baseband signal by filtering, decoding, or digitizing the baseband or intermediate frequency signal, or a combination thereof. The RX processing circuitry 325 transmits the processed baseband signal to the speaker 330 (such as for voice data) or to the processor 340 for further processing (such as for web browsing data and remittance).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, digitizes, or a combination thereof, the outgoing baseband data to generate a processed baseband or intermediate frequency signal. The communication unit 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices and execute the OS 361 stored in the memory 360 in order to control the overall operation of the electronic device 300. For example, the processor 340 could control the reception of forward channel signals and the transmission of reverse channel signals by the communication unit 310, the RX processing circuitry 325, and the TX processing circuitry 315 in accordance with well-known principles. The processor 340 is also capable of executing other applications 362 resident in the memory 360, such as, one or more applications for data sharing, remittance, fraud detection, and the like.

The processor 340 can execute instructions that are stored in a memory 360. The processor 340 can include any suitable number(s) and type(s) of processors or other devices in any suitable arrangement. For example, in some embodiments, the processor 340 includes at least one microprocessor or microcontroller. Example types of processor 340 include microprocessors, microcontrollers, digital signal processors, field programmable gate arrays, application specific integrated circuits, and discreet circuitry.

The processor 340 can be one or a plurality of processors. The processor 340 is also capable of executing other processes and programs resident in the memory 360, such as operations that receive, store, and timely instruct by providing image capturing and processing. The processor 340 can move data into or out of the memory 360 as required by an executing process. In some embodiments, the processor 340 is configured to execute plurality of applications 362 based on the OS 361 or in response to signals received from eNBs or an operator. The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. Input 350 can be a keyboard, touch screen, mouse, track ball, voice input, or other device capable of acting as a user interface to allow a user in interact with electronic device 300. For example, the input 350 can include voice recognition processing thereby allowing a user to input a voice command via microphone 320. For another example, the input 350 can include a touch panel, a (digital) pen sensor, a key, or an ultrasonic input device. The touch panel can recognize, for example, a touch input in at least one scheme among a capacitive scheme, a pressure sensitive scheme, an infrared scheme, or an ultrasonic scheme. Input 350 can be associated with sensor(s) and/or a camera 365 by providing additional input to processor 340. The camera can be used to capture images, such as a QR code, to be processed by the electronic device 300 or passed onto a server 200 on the network.

In certain embodiments, sensor 365 includes inertial sensors (such as, accelerometers, gyroscope, and magnetometer), optical sensors, motion sensors, cameras, pressure sensors, heart rate sensors, altimeter, breath sensors (such as microphone 320), and the like. The input 350 can also include a control circuit. In the capacitive scheme, the input 350 can recognize touch or proximity. The display 355 can be a liquid crystal display (LCD), light-emitting diode (LED) display, optical LED (OLED), active matrix OLED (AMOLED), or other display capable of rendering text and/or graphics, such as from websites, videos, games, images, and the like.

The memory 360 is coupled to the processor 340. Part of the memory 360 could include a random access memory (RAM), and another part of the memory 360 could include a Flash memory or other read-only memory (ROM).

The memory 360 can include persistent storage (not shown) that represents any structure(s) capable of storing and facilitating retrieval of information (such as data, program code, and/or other suitable information on a temporary or permanent basis). The memory 360 can contain one or more components or devices supporting longer-term storage of data, such as a ready only memory, hard drive, Flash memory, or optical disc. The memory 360 also can contain user data 363 that includes profile data and user history data. User data 363 can also contain data received from sensor 365. User data 363 can biographical and biometric data.

Electronic device 300 further includes one or more sensor(s) 365 that can meter a physical quantity or detect an activation state of the electronic device 300 and convert metered or detected information into an electrical signal. In certain embodiments, sensor 365 includes inertial sensors (such as accelerometers, gyroscopes, and magnetometers), optical sensors, motion sensors, cameras, pressure sensors, heart rate sensors, altimeter, breath sensors (such as microphone 320), and the like. For example, sensor 365 can include one or more buttons for touch input, (such as on a headset or the electronic device 300), a camera, a gesture sensor, a gyroscope or gyro sensor, an air pressure sensor, a magnetic sensor or magnetometer, an acceleration sensor or accelerometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an Infrared (IR) sensor, an ultrasound sensor, an iris sensor, a fingerprint sensor, and the like. The sensor 365 can further include a control circuit for controlling at least one of the sensors included therein. The sensor(s) 365 can be used to determine an orientation and facing direction, as well as geographic location of the electronic device 300. Any of these sensor(s) 365 can be located within the electronic device 300 or another electronic device in communication with the electronic device 300.

Although FIGS. 2 and 3 illustrate examples of devices in a computing system, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication networks, electronic devices and servers can come in a wide variety of configurations, and FIGS. 2 and 3 do not limit this disclosure to any particular electronic device or server.

Figure 4:
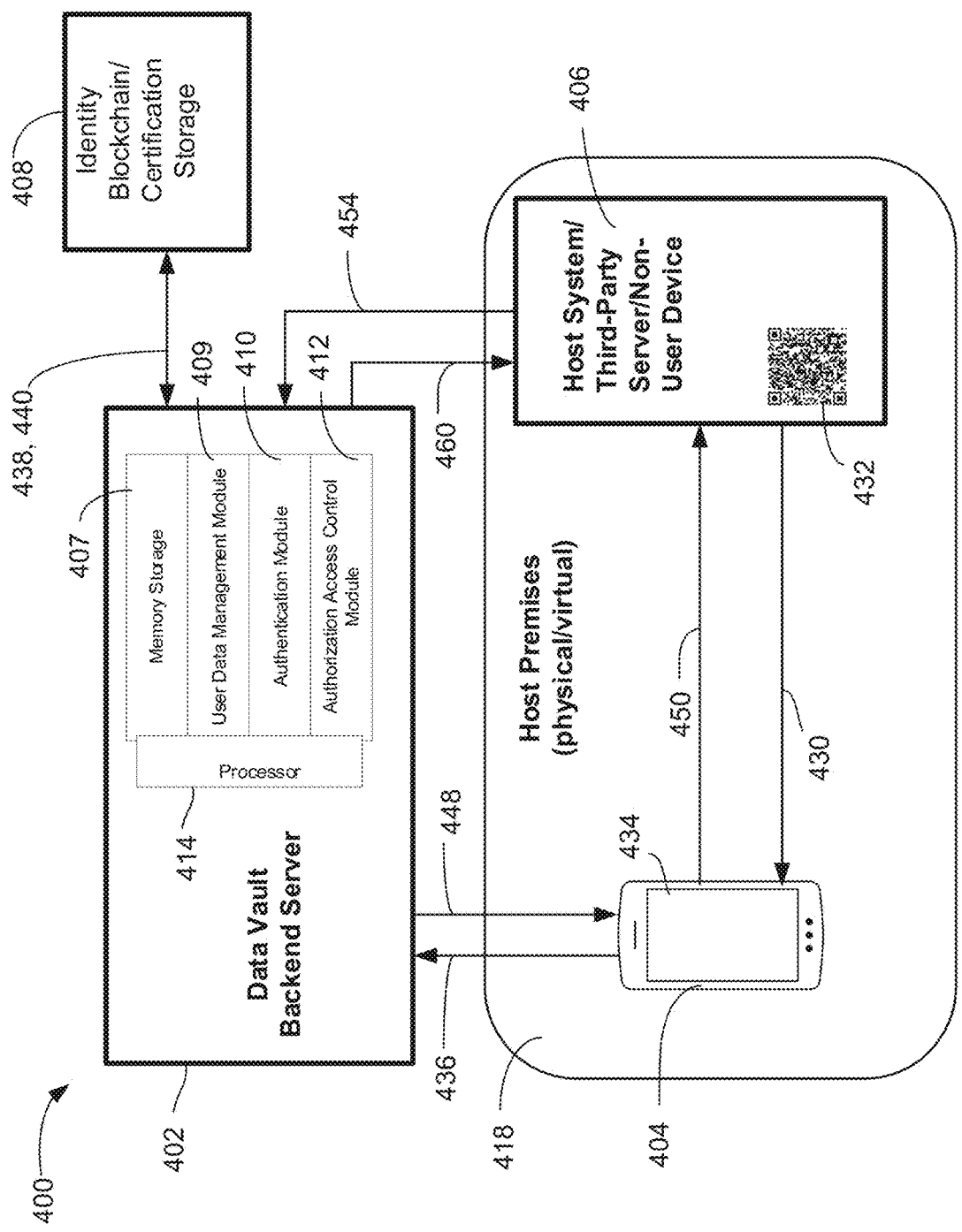
FIG. 4 illustrates an example of an anonymous data sharing system according to this disclosure.
Figure 5:
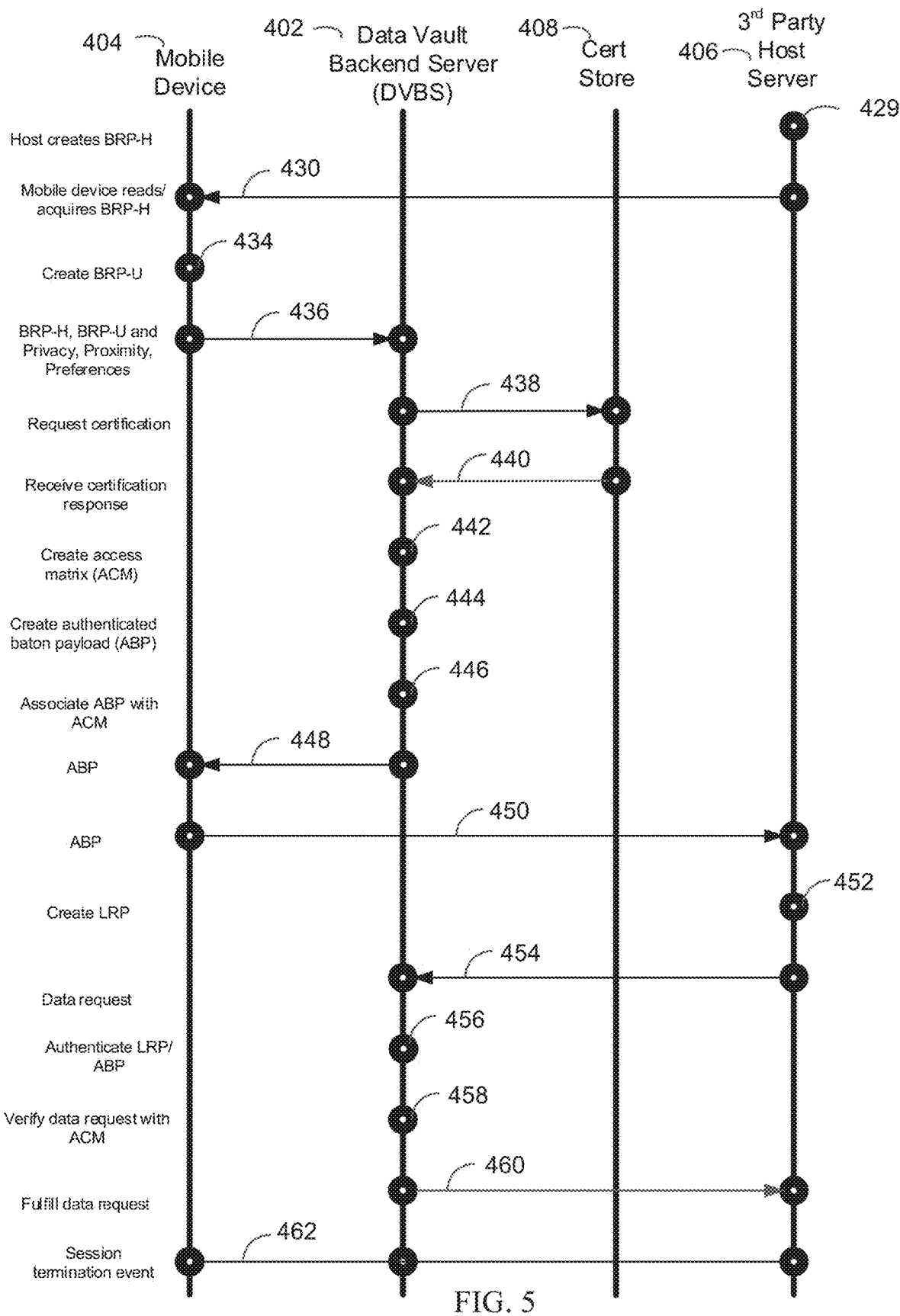
FIG. 5 illustrates a flow diagram of a method of secure and anonymous data sharing according to embodiments of this disclosure.

FIG. 4 and FIG. 5 are discussed herein together. FIG. 4 illustrates an example of an anonymous data sharing system 400 according to embodiments of this disclosure. FIG. 5 depicts a flow diagram of a method of secure and anonymous data sharing according to embodiments of this disclosure. FIGS. 4 and 5 together describe how system elements and methods according to various embodiments of the disclosure operate. The data sharing system 400 includes a data vault backend server (DVBS) 402, a client device 404, a non-user device 406, and an identity blockchain node 408. The DVBS 402 can be, for example, server 104 or 200 discussed in FIGS. 1 and 2. The DVBS 402 is configured to perform a variety of operations including user data management, authentication, and authorization access control of client data. In some embodiments, the memory 215, 407 of the DVBS 402 includes a user data management module 408, an authentication module 410 and an authorization access control module 412 that provide instructions to the processor 414 for execution.

The client device 404 can be an electronic device 300 as illustrated in FIG. 3. The client device 404 can come in a wide variety of configurations including a mobile telephone, mobile device, a PDA, a laptop or desktop computer, a tablet computer or other reasonable facsimile or derivation thereof. The client device 404 may also be interchangeably referred to as user device, a mobile device 404 or an electronic device herein.

The non-user device 406 may also be referred to as a third-party server or host 406 server or system in various embodiments of this disclosure. In FIG. 4, the non-user device 406 is depicted as a host system that is utilized on or about a host premises 418. The host premises 418 may be the physical premises of, for example, a store, a hotel, an amusement park or entertainment environment, a restaurant, resort or residential location. The host premises may also be a virtual premises proximate to or in communication range of a computer, server, or communication node connected thereto that is operating as an online shopping application, a virtual terminal or point of sale device, or an internet of things (IoT) device. The non-user device 406 can be a host system, server, third-party server, IoT device, other electronic device or a combination of these systems devices. For example, if the non-user device available at the host premises is not a high end or smart device, a host server may create data packets for the non-user device on the premises to send or display, for example, as a QR code to be read by the client device. Subsequently, the host server may connect to the DVBS to acquire needed and user authorized user data. As such, in various embodiments, the non-user device 406 operating as a host system, a server, a third-party server, IoT device or any combination of these devices may need to make a request to obtain information or data either directly or indirectly from the user's data vault associated with the DVBS or the client device in order to provide a service, make a list, sell or purchase a product or service, or control the function of an IoT device in accordance with a client device interaction. In embodiments of this disclosure, the non-user device 406 may request and obtain only data associated with the user in accordance with user and DVBS defined access rules or the session there-between will be suspended or terminated. Additionally, the non-user device or host system 406 cannot request and is not provided user identification information that specifically identifies the user of the client device 404 or the owner of the data obtained via the DVBS.

The identity blockchain 408 may be a blockchain node or a blockchain network of nodes associated with the DVBS 402. The identity blockchain 408 aids the DVBS in performing the task of validating or certifying non-user devices 406 as being properly associated with the data sharing system 400 prior to the DVBS sharing any user related data with the non-user device 406 that is requesting data. In various embodiments validation and certification techniques other than blockchain validation and certification techniques can be utilized to validate a non-user device. For example a variety of public key-private key or other known cryptography techniques in association with certification storage data servers could be utilized by a DVBS 402 to verify, validate and certify the authenticity of non-user devices or third-party servers 406.

In various embodiments when initializing embodiments the disclosure, initially each client device 404 and each host system 406 establishes an identity with the DVBS 402. For example, a user of a user device 300, 404 may want to be able to share particular limited information or data with third-party servers or host systems 406. To do so, the user or client device 404 registers an account with or establishes a user identity with the DVBS 402. Registration or establishment of a user identity can include the client device providing user identity information, geographic location, client device information, user related information, user data and user data sharing preferences to the DVBS 402.

The DVBS 402 can create a user account associated with user device 404. In various embodiments, when a user account is created, the DVBS 402 creates and stores in memory 402 user device related access condition preferences and user data maps. In various embodiments the DVBS 402 system organizes the access condition preferences and user data associated with a user device 404 and its designated user into a data map or matrix. The DVBS 402 system creates categories and organizes user data and preferences into mappings or separate groupings for user related data, interests and preferences such as, shopping preferences, ambient environment preferences, hotel preferences, airline and travel preferences, entertainment preferences, and restaurant preferences just to name a few potential mapped or grouped examples. The user can have an option to create new mappings or to modify existing DVBS 402 system generated mappings, groupings or organization of the user's related data or preferences contained in the mappings or groupings. In various embodiments, maps of user or client device related preferences and data can be populated by the DVBS 402 based on present and historic user interaction with the client device.

In various embodiments, the non-user device, interchangeably referred to herein as a third-party server or the host system 406, establishes a host identity with the DVBS 402. For example, a host service responsible for the host system 406 may want to be able to receive and utilize receive user related data from verified user devices to complete shopping order transactions, complete point-of-sale transactions, fulfill orders, receive analytical data, control IoT devices such hotel lights and thermostat settings, add user selected items to shopping carts, place/change travel related plans or reservations, or receive anonymous survey information. To establish a certified third-party or host identity with the DVBS 402, the host 406 and DVBS 402 may use existing known methods like blockchain or public key cryptography standards (PKCS) such that DVBS 402 can verify that the host system 406 is certified and vice versa.

In various embodiments of the disclosure, each user related client device 404 establishes a certified identity with the DVBS 402 to establish a secure identity using known techniques that may include blockchain or PKCS.

Still referring to FIG. 4, a user of a client device 404 can physically or virtually enter a host premises 418. The user and client device 404 may physically enter a host premises 418 such as a store, hotel or restaurant and be able to shop, control lights and thermostats, or order a meal anonymously. Thus, the host premises 418 is a physical area where a host third-party entity is a shop, hotel, or resort that has a host system or non-user device 406 that can interact with the user's client device 404 when within the physical premises of, for example, the shop, hotel or resort. Alternatively, the user device 404 can be in a virtual host premises 418 when, the user device 404 is interacting, for example, with a terminal or kiosk that is operating as a remote location for the host system 406. As such, a virtual host premises can be created almost anywhere using a NFC, WiFi, a LAN, BLUETOOTH or other reasonable communication channels to enable communication between the client device 404 and the host system 406 in accordance with embodiments of this disclosure.

When the client device 404 is within the host premises 418, the host system 406 is configured to, for example, interact with the client device 404 via a DV client application installed on the client device 404. In various embodiments the DV client application on the client device can display a user interface (UI) on the client device so the user can interact with the host system 406. The host 406 creates 429 and transfers 430 a baton request payload-host (BRP-H) to the client device 404. The created BRP-H is a type of data package of a specified or predetermined length or format. The BRP-H contains data from the host 406 that is required by the DVBS 402 to support identification of the host system 406. The BRP-H can also include additional parameters required by the DVBS 402 in order enable the DVBS to certify the identification of the host 406 system. The host 406 generates the BRP-H 429 of predetermined length as defined by and in accordance with the host system's registration and an application provisioning processes associated with the DVBS 402. In various embodiments, the BRP-H 430 provided to or read by the client contains host system identification records, host location information, and a host capability matrix. The BRP-H 430 may also include custom parameters from the host storage, host sensor data or other data required or applicable to the DVBS 402 system implementation, host system implementation or integration of the host system with the overall system 400.

The BRP-H 430 is transferred from the host system 406 to the client device 404 via an established transport channel or technique. In some embodiments, the anonymity of the user is increased when the client device 404 uses a reader or camera sensor to read a quick response (QR) code 432 or a short visual code (SVC) (not specifically shown in FIG. 4) upon entrance to the host premises 418. For example, a QR code 432 may be displayed on an electronic display for a user's client device to scan when entering a store or resort area. In some embodiments, the user device can decodes the scanned QR code 432 using the DV client application installed in the user device.

In some embodiments, at 434, the client device 404 can optionally create a baton request payload-user (BRP-U). A BRP-U can contain a device identifier, a user identifier, a user account identifier, and additional session control parameters for use by the DVBS 402. The additional session control parameters can include additional or specific data that may be shared with the host server 406 via the DVBS 402 based on one or more of user input or other deductions based on data points learned, stored or observed by the DVBS 402 or the client device 404. The created BRP-U is a type of data package of a specified or predetermined length or format.

The client device 404 sends the BRP-H, and if available the BRP-U, to the DVBS 402 system at step 436. The BRP-U data may be created by the DV client application. The client device 404 may also send additional parameters with the BRP-U. Such additional parameters can include proximity data indicating whether the client device is within the physical or virtual proximity of the host premises 418 and other preference data required for the anonymous operation/transaction that the DVBS 402 is to accomplish with the host server 406 on the client device's behalf.

Upon receipt of the BRP-H, the DVBS 402 is configured to determine whether the host 406, identified in the BRP-H by the host system identification, is authentic and corresponds to a host 406 system that has an active registered account with the DVBS 402. The DVBS 402 sends an authentication request 438 to an identity blockchain node 408 or utilizes, for example, PKCS encryption techniques with a certification storage server. The blockchain node 408 analyses the authentication request and sends a response to the certification request 440 back to the DVBS 402 indicating whether the received host system identification authenticates the host system. If the host system identification cannot be authenticated or certified as valid, the session creation is terminated by the DVBS 402 and an indication that data sharing with the host 406 system failed is sent to the client device 404.

In some embodiments, the host system 406 identification can be authenticated or verified by the DVBS 402. When the host system identification is authenticated or certified, then the DVBS 402 designates the host as being authenticated at 442.

Additionally, the DVBS 402 uses information provided from the client device, such as the user identifier, to verify or certify that the client device is authentic and is not counterfeit or being emulated. The DVBS may utilize PKCS encryption-decryption techniques and a certification data storage to accomplish verification or certification of the client device.

The DVBS will then initiate a session between the client device 404 and the host 406. The DVBS 402 may also update or create an access condition matrix (ACM) derived from or based on various parameters associated with the user's preferences, the user's client device, and the contents of the BRP-H. The access condition matrix is stored in the memory storage of the DVBS 402 and associated with the client device 404 and the user's account. In various embodiments there can be a different ACM created for different sessions. As such, a different ACM may be created for each different third-party host at, for example, a hotel, a restaurant, and a ridesharing service.

The DVBS 402 creates an authenticated baton payload (ABP) at 444 based on information from the ACM. In various embodiments, the ABP payload content can be secured using PKCS encryption techniques so that only the host system 406 can obtain the session parameters from the ABP. The ABP's baton payload can include information and parameters that identify the session uniquely. In an embodiment the ABP may include a reference to the ACM for the session. The ACM itself would not be included in the ABP. The ABP does not include user identification information about the user of the client device. The ABP also does not include the identity of the user device and user device properties like, the OS, the OS version, the user device specifications, such as screen size, without prior user permissions. The created ABP is a type of data package that can be of a specified or predetermined length or format.

In various embodiments, user identification information about the user of the client device is understood to include personally identifiable information (PII) or sensitive personal information (SPI). Such PII or SPI are defined as information that can be used on its own or with other information to identify, contact or locate a single person, or to identify an individual in context. In some embodiments, the information that identifies a user can be more broadly defined as "personal information of the user," that can further include information from which the user's identity is reasonably ascertainable. Thus, in order to provide anonymous data sharing, the DVBS does not provide at least one of personally identifiable information (PII), sensitive personal information (SPI), and in some embodiments personal information of a user to any third-party server or host system 406 by the DVBS 402 via the client device or via any other direct or indirect communication with the host system 406, unless the user had previously provided permission to the DVBS to allow the host system to access that data.

At step 446, the DVBS associates the ABP information for the session with ACM information, which is already associated with the user, and stores the association with the ACM in the DVBS's memory, such as the server storage device memory 215 in FIG. 2.

At step 448, the DVBS 402 transmits the ABP to the client device 404. The client device 404, in turn, sends 450 the ABP or, in some embodiments an authenticated token portion of the ABP, to the third-party server or host system 406. In various embodiments, the client device 404 provides and the host system 406 receives the ABP or token via a predetermined channel, such as a QR code read from a display screen of the client device by the host system, a near field communication (NFC) channel, WiFi, LAN, BLUETOOTH or other channel.

After receipt of the ABP or token from the client device, the host system 406 sends a data request to the DVBS 402. The data request requests user related data in accordance with the preferences established at the time of the session creation. These preferences are trackable or retrievable using parameters available in the ABP data packet. The session preferences are not in the ABP data packet, but instead the parameters in the ABP data packet enable the DVBS 402 to retrieve an appropriate ACM, read the session preferences therefrom and enforce the session parameter restrictions. In various embodiments, the host system 406 sends the appropriate parameters retrieved from the ABP along with any required computed parameters as required by the protocol to the DVBS 402 in step 454. In an embodiment custom parameters can be included with the data sent to the DVBS 402. The custom parameters can be parameters agreed on between a DVBS operator and the third-party. When custom parameters are included, the third-party host system 406 can include the custom parameters as raw data or after applying an algorithmic process to them. Custom parameters provided by the third-party host system 406 can include, but are not limited to, third-party system identity details, location details, capability matrixes, specific memory data, sensor data or data from other electronic system or devices that are applicable or required for the particular session. In yet other embodiments, the host system 406 uses data provided from the ABP or token to create a tamper proof encrypted lap request payload (LRP) that can be decrypted by the DVBS 402. The created LRP is a type of data package that can be of a specified or predetermined length or format. The request for user related data can also include a unique request identifier that is a continuously increasing number that increases at a predetermined constant rate. The predetermined constant rate is specified by one of the parameters in the ABP. The unique request identifier can be used by the DVBS 402 to increase the confidence that the entity sending the ABP, LRP or token is properly identified as the host that is part of the session and authorized to request data associated with the client device 404 from the DVBS system 402. The DVBS 402 receives the ABP, LRP, or token along with the unique request identifier at 456 from the host 406. The DVBS 402 proceeds to determine the authenticity of the data request at step 456. If the received data request (i.e., ABP, LRP or token) is not authentic, the session is ended by the DVBS 402. Alternatively, when the received data request is determined to be valid and authentic, the DVBS 402 can use parameters extracted from the received ABP, LRP or token to retrieve the ACM created during the session creation 442 in order to further verify at 458 that the received ABP, LRP or token are associated with the previously created access condition matrix (ACM). When the DVBS 402 verifies this association, the DVBS 402 can fulfill the request for data as long as the request adheres to the access conditions and preferences of the ACM at 460. The DVBS 402 does not provide any user identification information when providing requested data to the host 406. For example, if a payment data for a product or service was requested and is being provided by the DVBS 402 to the host 406, the payment data or transaction information is accomplished without providing any user identification information. In other embodiments, the requested data may be requested by the host 406 system to control an IoT controlled thermostat or lighting system in a hotel room occupied by the user of the client device. Again, no user identification information is provided to the host system to control an IoT thermostat or lighting in a predetermined hotel room associated with the client device by the DVBS 402 via the access condition matrix (ACM).

In various embodiments, if the user provides permission in the user preferences, the third-party server or host 406 can push session related content or information back to the user's profile in the DVBS 402 for future use by the client device 404 or the host 406. For example, the host system may push photos, estimated price or cost information, discounts, coupons, prior settings, incentives, map data or other information to the DVBS 402 for placement in user data maps stored in the DVBS 402 and associated with the client device or the user's account. Of course the user must have given consent for the DVBS to accept such data from the host 406 at the time of session establishment. In various embodiments the DVBS labels such user data maps for tracking, retrieval, or to attach expiry alarms associated with the data.

When the user's client device 404 leaves 462 the host premises 418, the DVBS 402 invalidates or terminates the session or virtual terminal service (VTS) between the host 402 and the client device 404. Determining whether the client device has left the host premises can be accomplished based on a proximity setting preference associated with a GPS location, signal strength or other known technique of determining whether the client device is within the host premises or proximate to the third-party system or other designated devices such as an IoT device or within range of a local area network (LAN).

Figure 6:
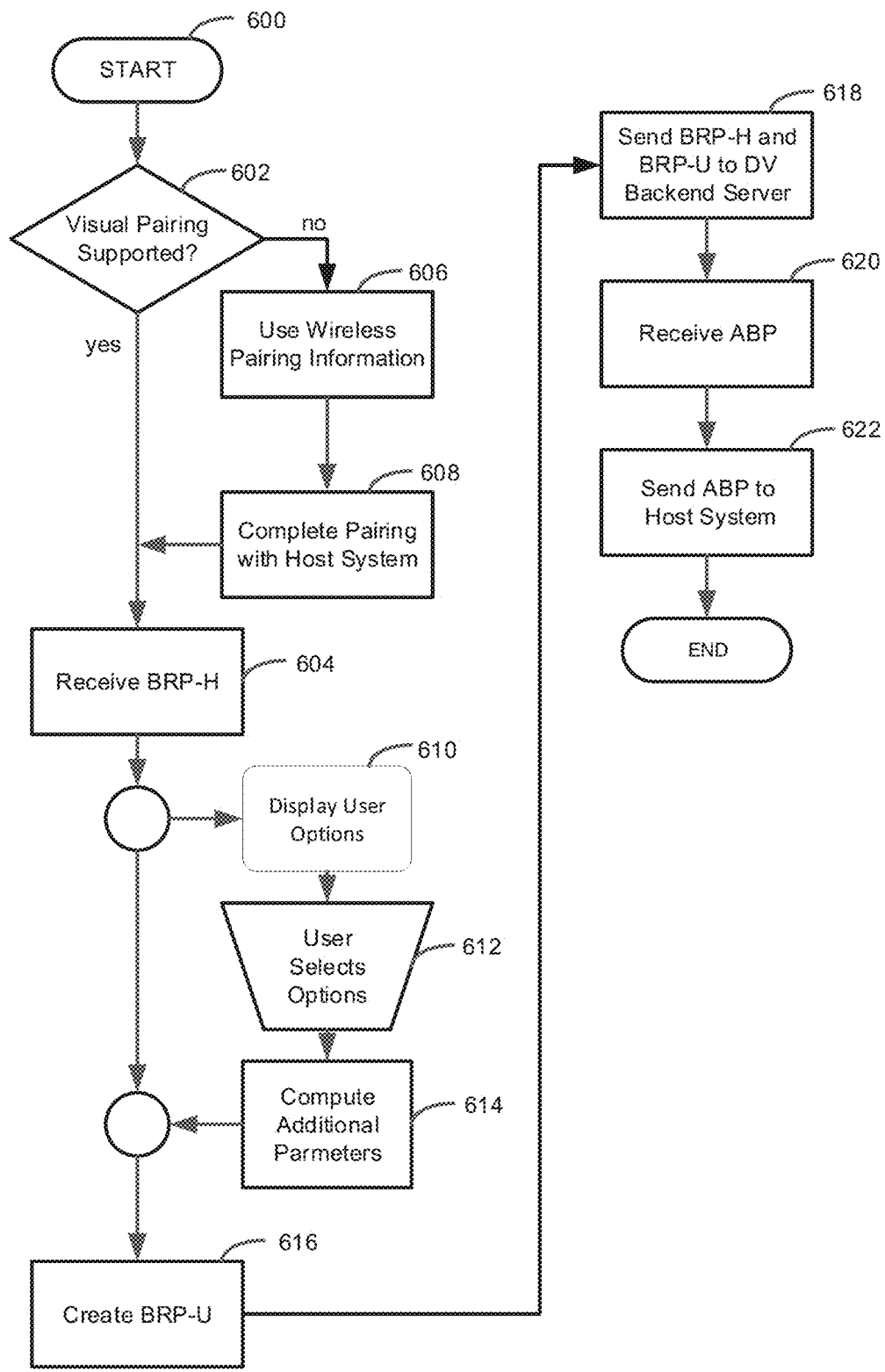
FIG. 6 illustrates an example of visual or non-visual pairing of the host system 406 with the client device 404 in accordance with embodiments of the disclosure.

FIG. 6 illustrates an example of visual or non-visual pairing of the host system 406 with the client device 404 in accordance with embodiments of the disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processing circuitry in, for example, a wireless node, mobile station, or base station.

At 600, a user with a client device enters a host premises, such as a store, a ski resort or amusement center. Upon entry, the user opens a digital vault application on the client device. In some embodiments, when visual pairing of the host system and the mobile device is supported at 602, the client device captures a visual code such as a VR code or other visual token provided by the host system. The client device can use a VR code reader or a camera to capture the visual code. The captured visual code may have been displayed on a display screen on or near an entrance to the host premises. The captured visual code is read and used by the digital vault application to provide the user's client device a baton request payload-host BRP-H at 604.

Alternatively, if at 602 visual pairing is not supported by the host, the user may open a digital vault application on the user's client device and enter into a wireless field of the host system. The wireless field may be an NFC, WiFi, LAN, BLUETOOTH or other wireless communication channel within communication range of the client device. At 606, the client device sends a signal over the wireless communication channel to the host system to initiate a pairing process using the digital vault application and prescribed pairing information. At 608, the client device and data vault application interact with the host system to complete the pairing processes. After the pairing process is completed, at 604 the client device receives the BRP-H from the host system via the designated communication or data transport channel. The BRP-H can contain host system identity records such as a host system or third-party identifier, location details, a capability matrix along with other custom parameters obtained from the host system's memory storage, sensors or other electronic devices or systems that are applicable and required for the particular DVBS anonymous data sharing implementation or host system implementation between the client device and host system interaction.

In some embodiments, the user's client device, running the data vault application, displays a user interface (UI) to the user with additional user options at 610. The additional user options can include, without limitation, additional privacy settings, request for additional information or preferences. For example, a user may be queried and choose to share a loyalty identification with the host system in order to obtain an enhanced or better store experience with the host system. In some embodiments the UI allows the user to set proximity levels. For example, if the proximity level is set to a BLUETOOTH, WiFi or GPS defined premises area, when the user moves outside the allowed signal strength range or premises area for a set amount of time the DVBS virtual terminal session between the client device and the host is ended. In various embodiments, the user can configure the proximity level based on other options provided by the host premises in the UI. For example, the proximity range could be changed based on beacon technology, tile technology, active RFID technology or other proximity defining technologies available on the host premises. Thus at 612, the user can select or change preferences and options via the UI on the user's client device.

At 614, the client device or data vault application running on the client device computes additional parameters or preferences based on a suggested configuration previously received from the DVBS when the user account for the client device was created. The additional parameters or preferences can also be based on other parameters obtained by the client device from local computation based on, for example, population behavior or user behavior when interacting with the present host system or similar types or categories of host systems.

At 616, the mobile device or client device may create a baton request payload-U (BRP-U) that includes a client device identifier, a user account identifier and perhaps one or more of the additional parameters. At 618, the mobile device sends the BRP-H and, if created, the BRP-U to the DVBS. The BRP-H and BRP-U are each a type of data package that can be of a specified or predetermined length or format.

Figure 7A:
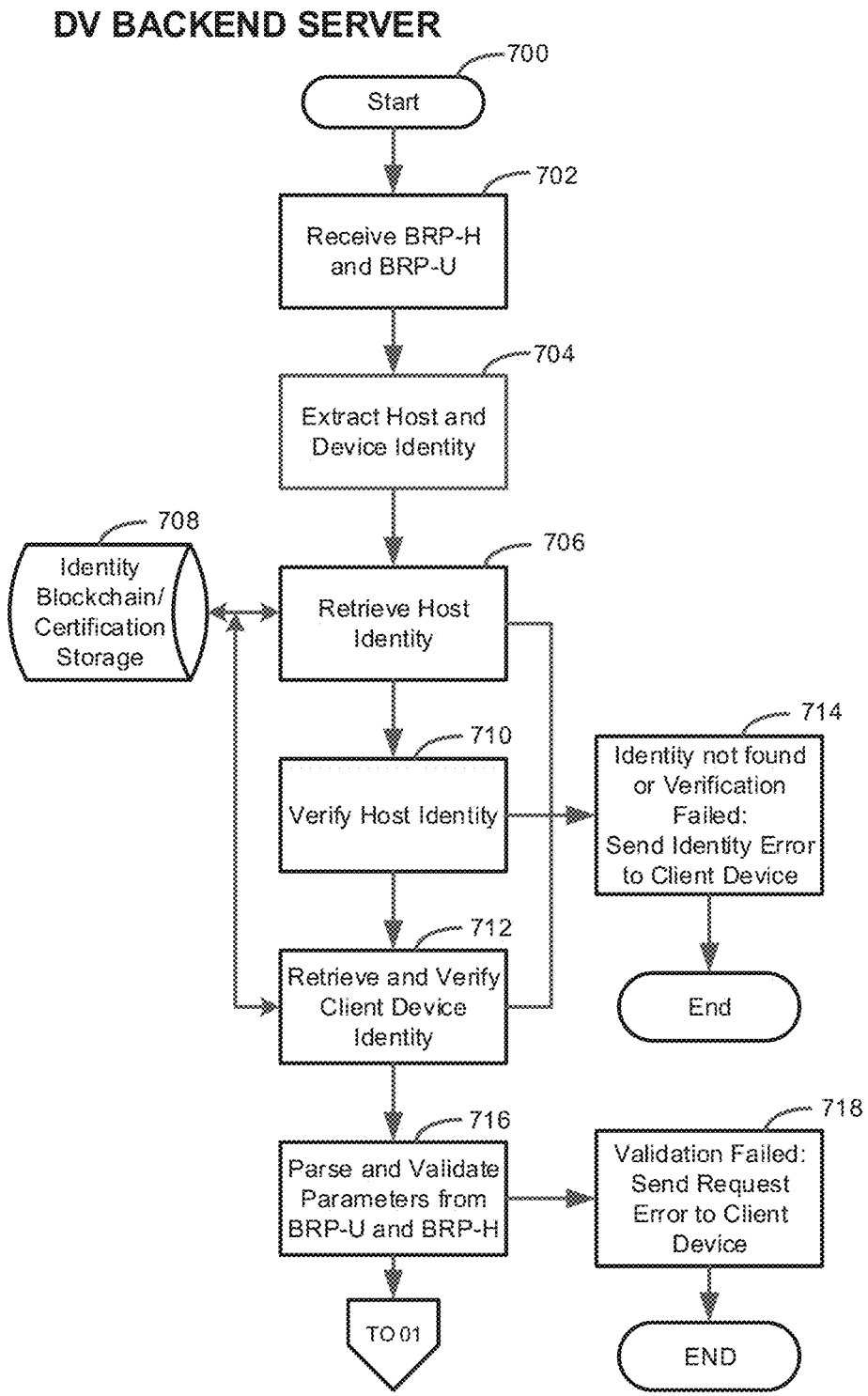
FIGS. 7A and 7B illustrate an example of a DVBS receiving and verifying a baton request payload and providing an authenticated baton payload (ABP) in accordance with embodiments of this disclosure.
Figure 7B:
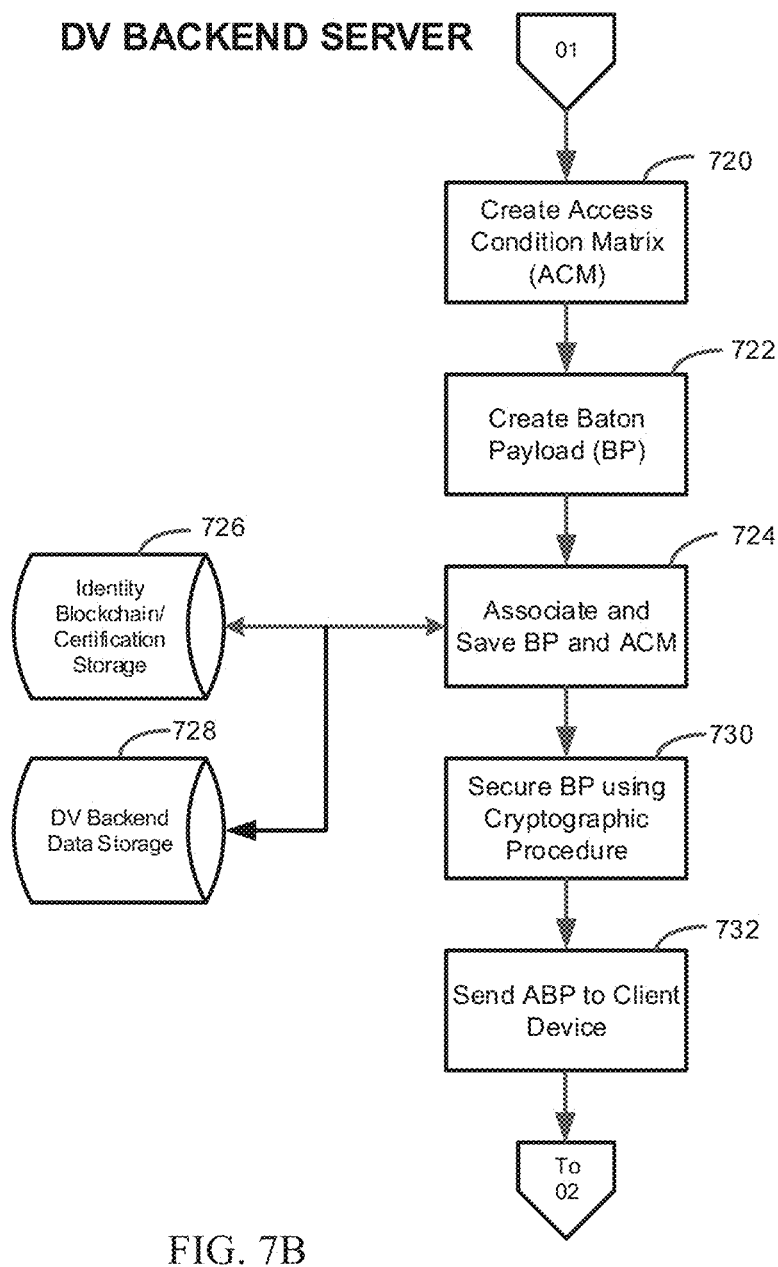

FIGS. 7A and 7B illustrate an example of a DVBS receiving and verifying a baton request payload and providing an authenticated baton payload (ABP) in accordance with embodiments of this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processing circuitry in, for example, a wireless node, mobile station, or base station.

At 700, the DVBS has already created an identity account for the user and the user's client device; the host has also already established a host identity with the DVBS; and, the client mobile device and the host have already paired. At 702, the DVBS receives the BRP-H from the client device that was originally provided by the host system. In some embodiments, the DVBS also receives a BRP-U created by the client device. The DVBS extracts the host and client device identities together with any included parameters or preferences also in the received BRP-H and BRP-U at 704.

At 706, the DVBS can, for example, send the received host identity to an identity blockchain or certification storage server 708 and request receipt of certification of the host systems identity in accordance with, for example blockchain certification or public key-private key cryptography techniques. Based on receipt of certification of the host system's identity, the DVBS verifies or authenticates the host identity at 710. At 712, in various embodiments the DVBS also requests receipt of certification of the client device identity received as part of the BRP-U from the certification storage 708 and then verifies or authenticates the client device identity.

When the host identity is not found or cannot be certified at 706 or when the host identity cannot be verified at 710, then an error message is sent to the user's client device at 714 indicating that an error occurred when identifying the host and the transaction or that the session establishment is canceled or that the data transfer session is terminated. One reason that each instance of creating a session requires authentication of each device and host system in the session is done is to help protect the user of the client device from impersonation attacks from fraudulent host system that is requesting user related data under fraudulent circumstances. Additionally, when the user or client device identity is not found, certified or authenticated at 712, an identity error message is sent to the client device at 714 indicating that the user's account or client device's identity resulted in an error. Checking the validity of the user identity and client device at each instance of potentially creating an anonymous data sharing session between the client device and the host system is done is to help protect the user from a fraudulent client device posing as the user and attempting to perform an anonymous data transaction via the DVBS or with the host system. As such, embodiments of the disclosure authenticate each client device and host at each instance of creating a session between the client device and a host system. Each instance of a session being created between a host and a client device can quickly be terminated when the identity of either the host or the client device cannot be properly found, certified and verified so as to minimize vulnerability of the anonymous data sharing to impersonation attacks by an unknown entity prior to any user related data being provided to a requesting host system.

In an embodiment, when the user or client device identity is not found, certified or authenticated at 712, an identity error message could be sent to the client device at 714, or in various embodiments, to an alternate user device or via an Out of Band (OOB) communication channel, such as email, text or other communication channel. The OOB communication can alert the user about a fraudulent activity. Additionally, in some embodiments the DVBS can identify anomalies or deviations from a generally acceptable or learned normal behavior of the device user or of similar device users. In such a scenario, based on a predetermined algorithm, the DVBS can block access to a portion of or all of the stored information related to the user's device and/or the device user. The user is also alerted using the OOB communication channel(s) about the blocked access. Upon receiving such an alert, the user can contact a designated operating team or system via well-advertised communication channels, prove their identity as per an established process so as to initiate a set of directives for handling the user's data while and until any malicious activities are mitigated and normal operation is restored to the user's account.

At 716, the DVBS parses and validates parameters received from the BRP-H and BRP-U to make sure they are consistent with each other and in accordance with the data sharing rules or parameters stored in the DVBS in association with the user's account or identity. If a single parameter or rule is not consistent with the parameters received in either the BRP-H or BRP-U, then the DVBS sends a data request error to the user device at 718 and terminates creation of the session. Conversely, when the parameters from the BRP-U and BRP-H are validated as consistent, the DVBS creates an access condition matrix (ACM) at 720.

The ACM is created by the DVBS at 720 by encoding the exact data access rules that apply for the particular session between the user's client device and the host system that is under construction. The ACM is stored in the DVBS memory storage in association with the user's account and the created session (i.e., session identifier) with the host. At 722, the DVBS creates an authenticated baton payload (ABP). The ABP contains at least the necessary session parameters that uniquely identify the created session between the client device and the host. At 724, the DVBS associates the ABP and the ACM with each other in memory storage 728 to create a logical anonymous data sharing session. In some embodiments, the association of the ABP and the ACM are stored in one or both of another blockchain, separate from the identity blockchain store 726, and the DVBS memory storage 728.

The DVBS secures the ABP using a PKCS encryption process so that only the host system can decode and obtain the necessary session parameters, including data access rules, from the ABP at 730. The ABP is then sent to the client device at 732.

Referring back to FIG. 6, the client device receives the ABP at 620 and sends the ABP to the host system at 622. The host system receives the ABP from the client device, decrypts the parameters from the ABP and securely saves the decrypted parameters in memory or in a storage associated with the host system.

Figure 8A:
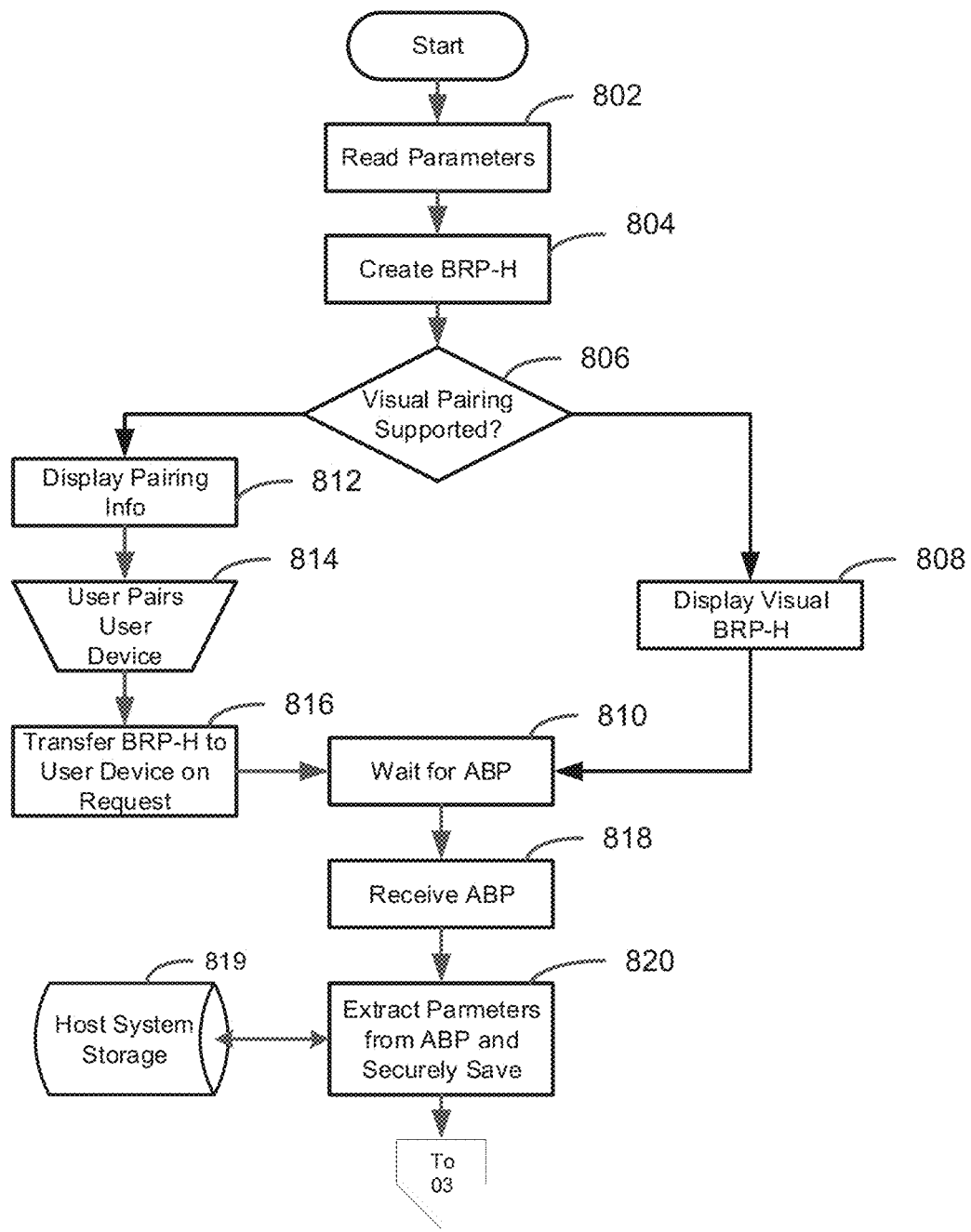
FIGS. 8A and 8B illustrate an example of a host system after receiving an authenticated baton payload (ABP) from the user's client device in accordance with embodiments of this disclosure.
Figure 8B:
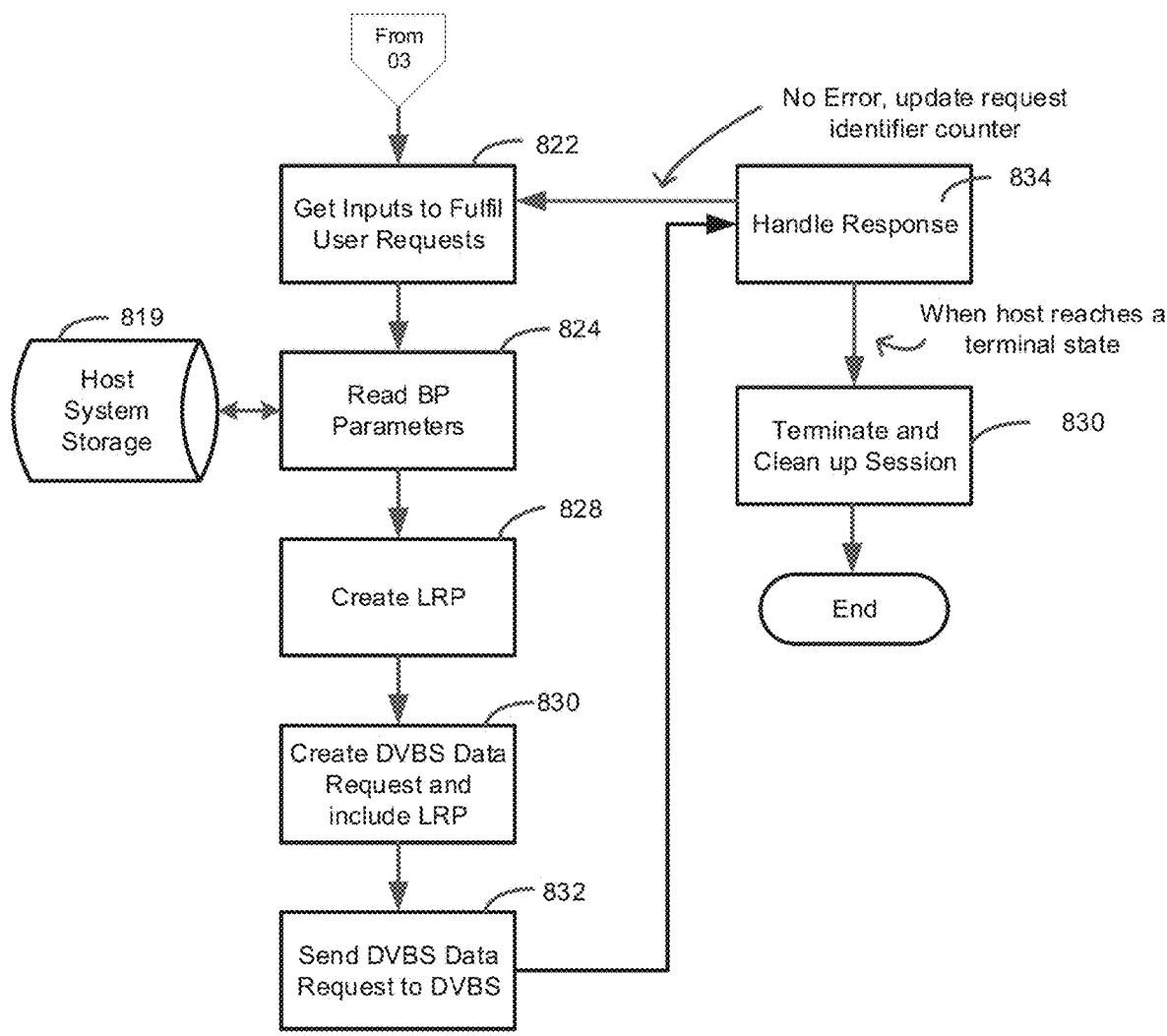

FIGS. 8A and 8B illustrate an example of a host system after receiving an authenticated baton payload (ABP) from the user's client device over the transport channel used previously or by establishing a new channel. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processing circuitry in, for example, a wireless node, mobile station, or base station.

When the client device is within the host premises, the host system is configured to, for example, interact with the client device via a DV client application installed on the client device. In various embodiments the DV client application on the client device can display a UI on the client device so the user can interact with the host system. The host, at 802, reads parameters from the host system in order to generate a BRP-H at 804. The BRP-H is a type of data package. The BRP-H contains data from the host that is required by the DVBS to support identification of the particular host system. The BRP-H can also include additional parameters required by the DVBS to certify the identification of the host system. In various embodiments, the host creates the BRP-H as a data package of predetermined length or format in accordance with the host system's registration and an application provisioning process associated with the DVBS. In various embodiments, the created BRP-H includes one or more of host system identification records, host location information, and a host capability matrix. The BRP-H may also include one or more custom parameters from the host storage, host sensor data or other data required or applicable to the DVBS system implementation or integration of the host system with the overall system.

At 806, the host system determines if visual pairing with the client device is available. In some embodiments, visual pairing may be determined based on the interaction via receipt of information from the application installed on user device. In other embodiments, on the client device, the user selects via the digital vault application running on the client device whether to use visual or non-visual pairing with the host system. In yet other embodiments, the host system provides a user interface (UI) for the user to select whether the user's client device is to pair with the host system using a QR code (i.e., a visual code) or to pair using a wireless channel such as WiFi, NFC or BLUETOOTH. When at 806 visual pairing is supported and selected, at 808, the host system displays on a display a VR code, QR code or other visual token (i.e. a visual code) for the client device to optically capture in order to pair with the host system and obtain the BRP-H. In various embodiments, the initial pairing can be done using a visual code for security, then the BRP-H is provided to the client device from the host system via a wireless channel.

Alternatively at 806, the host system may determine that visual pairing is not supported, not selected by the client device, or that the user selected via a host system provided UI to pair using a wireless channel. Then, either the client device running the digital vault application may receive and display pairing information to the user on a UI at 812 or the host system provided UI will provide a WiFi name and password, or start BLUETOOTH or NFC pairing with the user's client device at 812 and 814. The user, via the UI of the client device or the host system, agrees to wirelessly pair with the host system at 814 wherein the host system and client device pair with each other. As such, while the client remains within the wireless filed or premises of the host system the pairing is maintained. The wireless field may be an NFC, WiFi, LAN, BLUETOOTH or other wireless communication channel within communication range of the client device. At 816, the host system transfers the BRP-H to the client device via a wireless channel.

At 810, the host system waits for the ABP to be sent from the client device. Upon receipt of the ABP from the DVBS, the client device sends the ABP and the host system receives the ABP via a wireless channel utilized earlier or by establishing a new channel at 818. The ABP contains at least the necessary session parameters that uniquely identify the created session between the client device and the host. At 820, the host reads and extracts parameters from the ABP and may securely store them in the host system storage 819. In some embodiments the parameters are securely stored using PKCS encryption and decryption techniques.

In some embodiments, the client device may, via the data vault application, include with the ABP or separately from the ABP additional user data such as a user request to purchase an item or a data instruction for controlling, for example, IoT devices in a particular hotel room on the host premises. At 822, the host system receives the additional user data inputs to fulfill the user request. The host system then extracts the parameters from the ABP payload using known PKCS encryption-decryption at 824. The host stores the additional parameters securely in the host storage, at 819 for use until the session between the host and the client device is terminated.

At 828, the host system prepares a DVBS request for data that requests user related data to be shared or provided to the host from the DVBS. In various embodiments of this disclosure, the DVBS request for data prepared by the host is in the form of a tamper resistant lap request payload (LRP). The LRP can include the parameters obtained from the ABP, such as parameters that aid the DVBS to retrieve the ACM from the DVBS database and the necessary parameters that identify the session. In various embodiments, the LRP also includes a unique request identifier. The unique request identifier can be a continuously increasing number count that increases at a predetermined rate, the predetermined rate may be constant or variable, as specified by one of the parameters from the ABP. The unique request identifier is used to uniquely identify request for data from the host. At 830, the host creates a DVBS request for data that includes the LRP. The request for data must conform to the data access rules and preferences. The request for data should not request any data that is not included in the data access rules. Additionally, the request for data cannot request user identification information. At 832, the host system sends the DVBS request for data to the DVBS.

At 834, if the DVBS allows the DVBS request for data to be fulfilled, the host receives the requested data and handles the response at 834. When no errors occur, the host returns to 822 and may collect additional inputs to fulfil user requests until the host reaches a terminal state. At a terminal state the host moves to 836.

At 836, the DVBS terminates the session when a terminal state is reached. Examples of a terminal state can include if there are no more requests from the particular user's client device within predefined time period, or in some embodiments, if the client device leaves the host's physical or virtual premises, then the session is terminated at the host and parameter data related to the specific session is cleaned, deleted or re-initialized.

Figure 9:
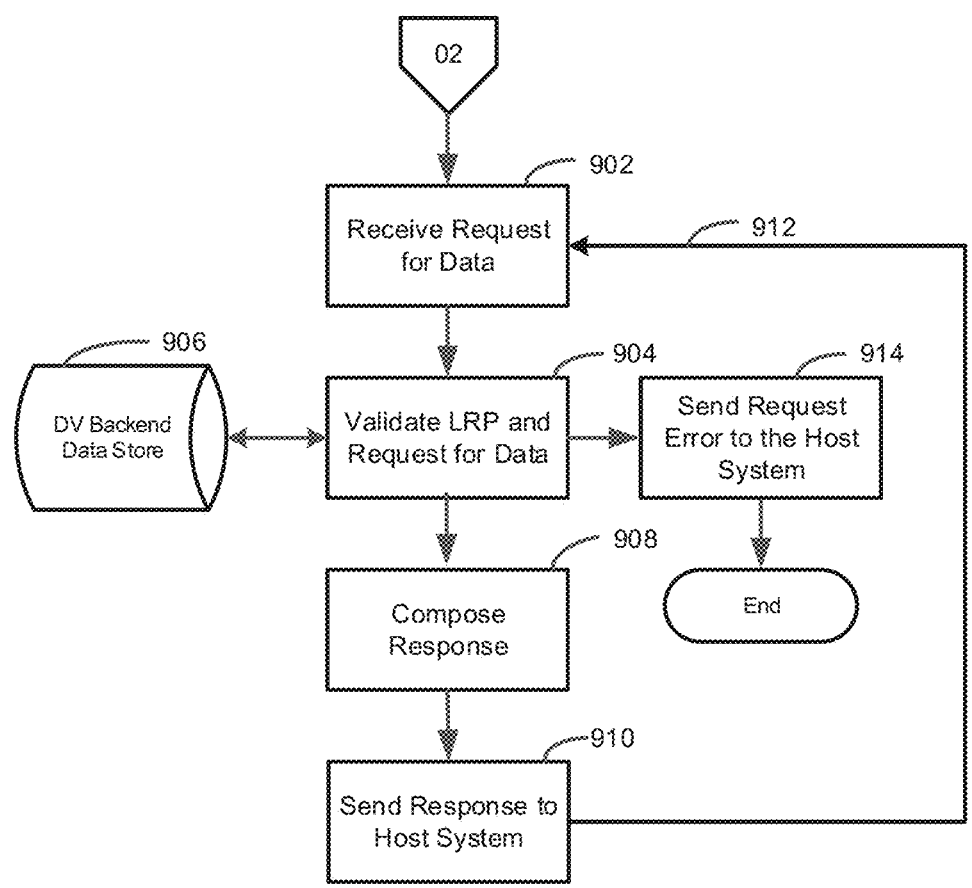
FIG. 9 illustrates an example of the DVBS receiving and responding to data request from a host in accordance with embodiments of this disclosure.

FIG. 9 illustrates an example of the DVBS receiving and responding to data request from a host in accordance with embodiments of this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processing circuitry in, for example, a wireless node, mobile station, or base station.

In FIG. 9 the DVBS receives a request for data from the host at 902. At 904, the DVBS, using PKCS encryption-decryption verifies the LRP included in the received request for data. The LRP is verified for integrity and authenticity by the DVBS. In some embodiments, the unique request identifier is used to further identify and differentiate the request for data from previous requests for data during the same session. After verification of the LRP, the DVBS proceeds with additional processing of the request for data contents. For example the DVBS verifies the incoming request for data against the ACM that was previously associated with the user's account and stored in the DVBS memory or data storage 906, the DVBS memory or data store 906 may be a combination of the identity database 726 and DV Backend Data Store 728, to determine that the host system is not requesting any unauthorized data. In some embodiments, the LRP includes parameters from the ABP that were previously provided to the user's client device so that the DVBS could verify the ABP received in the LRP with the ABP previously sent to the client device. The DVBS only allows the request for data from the host to be fulfilled when the conditions established at the time the session between the client device and the host system was created are completely and correctly satisfied by the host system.

Upon validation of the LRP and the request for data, the DVBS composes a response with the requested data at 908 and sends the requested data to the host system at 910. At 912, the session has not terminated and the DVBS can return to 902 to potentially receive another request for data. Each subsequent request for data must be properly validated before the DVBS composes another response to the same host system in order to further protect from impersonation attacks.

If verification of the request for data, the LRP or the contents of the LRP cannot be accomplished, the DVBS terminates the session and sends a data request error message to the host system at 914. In various embodiments, when verification of the request for data, the LRP or the contents of the LRP cannot be accomplished at 904, an verification error message could be sent to the client device and/or the host system at 914, or in various embodiments, to an alternate client device, or secondary host system location or via an Out of Band (OOB) communication channel, such as email, text or other communication channel. The OOB communication can alert the user and/or the host about a fraudulent activity. Additionally, in some embodiments the DVBS can identify anomalies or deviations from a generally acceptable or learned normal behavior of the device user, similar device users or the host system. In such a scenario, based on a predetermined algorithm, the DVBS can block access to a portion of or all of the stored information related to the client device and/or the device user or the host. The user and host may also be alerted using the OOB communication channel(s) about a blocked access. Upon receiving such an alert, the user and/or host can contact a designated operating team or system via well-advertised communication channels, prove their identity as per an established process so as to initiate a set of directives for handling the user's data while and until any malicious activities are mitigated and normal operation is restored to the user's account and/or the host system.

Embodiments of this disclosure can be used in various anonymous data sharing scenarios where user related data or transactions do not include sharing of user identification information. For example, when a user is shopping at a physical or virtual host premises, user created shopping lists can be seamlessly and anonymously shared with third-party host store servers. Additionally, a product or service may be paid for by the user's client device via the DVBS anonymously without identifying the individual purchasing the product or service to the host. In another example, embodiments of this disclosure may be used in smart living and travel-resort environments so that hotels, time share real-estate and short term rental industries can utilize a host system and DVBS based anonymous data sharing to access user related data information and/or feedback that can provide better rental-resort services without the user being concerned that their identity or any unauthorized personal data will be shared with the hotel or resort without their authorization to the DVBS service. In yet other embodiments of the disclosure anonymous user analytics can be obtained from mobile device users anonymously provided that each mobile device user has given permission and provided preferences of the data analytics that can be obtained by a host system. In various embodiments, the DVBS can impose restrictions on the number of analytic entries a same user account can provide. For example, if a particular two week survey requires unique inputs from a population of user devices when in a host premises area, each user or user device account will only be allowed to respond to the survey once when in the host premises area during the two week survey time frame. Additionally, embodiments of the disclosure can be used to enable user controlled personal data sharing wherein users can set the privacy level defining specific types of data that can be shared with non-user third-party servers, host systems or IoT devices. For example, when a user of a client device that has an account with a DVBS system visits a friend's home, the user can authorize via a UI of a data sharing application the friend's TV or entertainment center to retrieve the user's preferred genres of shows, movies, music or games from a data vault DVBS and play related shows, movies, games or music on the friend's TV or entertainment system without the user having to log into their own personal account. Instead, the friend's account is used to play the preferred genres of the user at the friend's home without identifying personal identity information of the user.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method for anonymous data sharing, the method comprises:
   receiving, by a backend server, client device information and a third-party data package;
   identifying, based on the client device information and the third-party data package, a personal user preference from a plurality of personal user preferences and interests;
   creating an authenticated payload (AP) including a session identifier and the personal user preference without including a user identification, the session identifier corresponding to a data sharing session;

sending the AP to a client device based on the client device information;

receiving, from a third-party server, a request for data and the AP previously sent to the client device; and providing, to the third-party server, requested data when the request for data corresponds with the personal user preference in the AP.

2. The method of claim 1, wherein the third-party data package comprises a third-party identifier and third-party data, the method further comprising certifying an identity of a third-party host based on the third-party identifier.

3. The method of claim 2, wherein the client device information further comprises at least one user option, and wherein the method further comprises corresponding the at least one user option with the third-party data.

4. The method of claim 1, wherein the personal user preference includes specific personal information, without including user identification information, associated with the client device information that can be provided to a third-party host associated with the third-party data package.

5. The method of claim 1, further comprising storing, in memory, the identified personal user preference in an access condition matrix and associating the access condition matrix with the session identifier.

6. The method of claim 5, wherein receiving the request for data and the AP further comprises verifying the received AP corresponds to the access condition matrix.

7. The method of claim 6, wherein verifying the received AP corresponds to the access condition matrix includes terminating an anonymous data sharing session based on the session identifier.

8. A backend server providing anonymous data sharing, the server comprising:

a memory; and at least one processor connected to the memory, the at least one processor configured to:

receive, from a client device, client device information and a third-party data package;

identify, based on the client device information and the third-party data package, a personal user preference from a plurality of personal user preferences and interests;

create an authenticated payload (AP) including a session identifier and the personal user preference without including a user identification, the session identifier corresponding to a data sharing session;

send the AP to a client device based on the client device information;

receive, from a third-party server, a request for data and the AP previously sent to the client device; and provide, to the third-party server, requested data when the request for data corresponds with the personal user preference in the AP.

9. The server of claim 8, wherein the third-party data package comprises a third-party identifier and third-party data, and wherein the processor is further configured to certify an identity of a third-party host based on the third-party identifier.

10. The server of claim 9, wherein the client device information further comprises at least one user option, and wherein the processor is further configured to correspond the at least one user option with the third-party data.

11. The server of claim 8, wherein the personal user preference includes specific personal information, without including user identification information, associated with the client device information, that can be provided to a third-party host associated with the third-party data package.

12. The server of claim 8, wherein the processor is further configured to store, in the memory, the identified personal user preference in an access condition matrix and to associate the access condition matrix with the session identifier.

13. The server of claim 12, wherein when the processor receives the request for data and the AP, the processor is further configured to verify that the received AP corresponds with the access condition matrix.

14. The server of claim 13, wherein when the processor cannot verify that the AP corresponds to the access condition matrix, the processor is configured to terminate an anonymous data sharing session based on the session identifier.

15. A non-transitory computer-readable medium comprising a plurality of instructions that, when executed by a processor of a backend server system, is configured to cause the processor to:

receive, from a client device, client device information and a third-party data package;

identify, based on the client device information and the third-party data package, a personal user preference from a plurality of personal user preferences and interests;

create an authenticated payload (AP) including a session identifier and the personal user preference without including a user identification, the session identifier corresponding to a data sharing session;

send the AP to a client device based on the client device information;

receive, from a third-party server, a request for data and the AP previously sent to the client device; and provide, to the third-party server, requested data when the request for data corresponds with the personal user preference in the AP.

16. The non-transitory computer-readable medium of claim 15, wherein the third-party data package comprises a third-party identifier and third-party data, and further comprising instructions that when executed by the processor, cause the processor to certify an identity of a third-party host based on the third-party identifier.

17. The non-transitory computer-readable medium of claim 16, wherein the client device information further comprises at least one user option, and further comprising instructions that, when executed by the processor, cause the processor to correspond the at least one user option with third-party data.

18. The non-transitory computer-readable medium of claim 15, wherein the personal user preference include specific personal information, without user identification information, associated with the client device information, that can be provided to a third-party host associated with the third-party data package.

19. The non-transitory computer-readable medium of claim 15, further comprising instructions that, when executed by the processor, further cause the processor to:

store, in a memory, the identified personal user preference in an access condition matrix; and associate the access condition matrix with the session identifier.

20. The non-transitory computer-readable medium of claim 19, further comprising instructions that, when executed by the processor, further cause the processor to:

verify whether the received AP corresponds with the access condition matrix when the processor receives the request for data with the AP; and terminate an anonymous data sharing session based on the session identifier when the processor cannot verify that the AP corresponds to the access condition matrix.

\* \* \* \* \*